(12) United States Patent
Gordon et al.

(10) Patent No.: US 11,492,543 B2
(45) Date of Patent: Nov. 8, 2022

(54) PROPPANT PARTICULATES FORMED FROM FLEXICOKE AND METHODS RELATED THERETO

(71) Applicant: ExxonMobil Technology and Engineering Company, Annandale, NJ (US)

(72) Inventors: Peter A. Gordon, Yardley, PA (US); Michael Siskin, Westfield, NJ (US); Harry W. Deckman, Clinton, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/159,209

(22) Filed: Jan. 27, 2021

(65) Prior Publication Data

US 2021/0253944 A1    Aug. 19, 2021

Related U.S. Application Data (60) Provisional application No. 62/971,529, filed on Feb. 7, 2020.

(51) Int. Cl.
*C09K 8/80* (2006.01)
*C09K 8/66* (2006.01)

(52) U.S. Cl.
CPC . *C09K 8/80* (2013.01); *C09K 8/66* (2013.01)

(58) Field of Classification Search
None
See application file for complete search history.

(56) References Cited

U.S. PATENT DOCUMENTS

| 3,664,420 | A | 5/1972 | Graham et al. |
| 3,700,032 | A | 10/1972 | Terry et al. |
| 2001/0001308 | A1* | 5/2001 | Varadaraj ............... C09K 23/00 516/38 |
| 2009/0283447 | A1 | 11/2009 | D'Elia et al. |
| 2011/0082033 | A1* | 4/2011 | Frohs .................... C04B 35/573 502/439 |
| 2014/0096952 | A1 | 4/2014 | Hocking |
| 2018/0339946 | A1* | 11/2018 | Öttinger ................. B28B 1/001 |

OTHER PUBLICATIONS

Labus et al., "The Concept of Coke Based Proppants For Coal Bed Fracturing", IOP Conference Series: Earth and Environmental Science 261 Paper Open Access, 2019, IOP Publishing Ltd.
The International Search Report and Written Opinion of the International Search Authority dated May 6, 2021.

* cited by examiner

*Primary Examiner* — Andrew Sue-Ako
(74) *Attorney, Agent, or Firm* — Vorys, Sater, Seymour and Pease LLP (57) ABSTRACT

Proppant particulates like sand are commonly used in hydraulic fracturing operations to maintain one or more fractures in an opened state following the release of hydraulic pressure. Fracturing fluids and methods of hydraulic fracturing may also use proppant particulates composed of flexicoke material. Such proppant particulates may have improved transport into fractures because of lower density than traditional proppants like sand and may produce fewer fines that reduce fluid flow through proppant packs.

20 Claims, 5 Drawing Sheets

PROPPANT PARTICULATES FORMED FROM FLEXICOKE AND METHODS RELATED THERETO

CROSS-REFERENCE TO RELATED APPLICATIONS

This application claims the benefit of priority from U.S. Provisional Application No. 62/971,529 filed Feb. 7, 2020, the entire contents of which are herein incorporated by reference in their entireties.

FIELD OF THE INVENTION

The present disclosure relates to fracturing operations and proppant particulates employed therein.

BACKGROUND OF THE INVENTION

A wellbore may be drilled into a subterranean formation in order to promote removal (production) of a hydrocarbon or water resource therefrom. In many cases, the subterranean formation needs to be stimulated in some manner in order to promote removal of the resource. Stimulation operations may include any operation performed upon the matrix of a subterranean formation in order to improve fluid conductivity there through, including hydraulic fracturing, which is a common stimulation operation for unconventional reservoirs.

Hydraulic fracturing operations pump large quantities of fluid into a subterranean formation (e.g., a low-permeability formation) under high hydraulic pressure to promote formation of one or more fractures within the matrix of the subterranean formation and create high-conductivity flow paths. Primary fractures extending from the wellbore and, in some instances, secondary fractures extending from the primary fractures, possibly dendritically, may be formed during a fracturing operation. These fractures may be vertical, horizontal, or a combination of directions forming a tortuous path.

Proppant particulates are often included in a fracturing fluid in order to keep the fractures open after the hydraulic pressure has been released following a hydraulic fracturing operation. Upon reaching the fractures, the proppant particulates settle therein to form a proppant pack to prevent the fractures from closing once the hydraulic pressure has been released.

There are oftentimes difficulties encountered during hydraulic fracturing operations, particularly associated with deposition of proppant particulates in fractures that have been created or extended under hydraulic pressure. Because proppant particulates are often dense materials, effective transport of the proppant particulates may be difficult due to settling, making it challenging to distribute the proppant particulates into more remote reaches of a network of fractures. In addition, fine-grained particles (referred to as "fines") produced from crushing of proppant particulates within the fractures can also lessen fluid conductivity, which may decrease production rates and/or necessitate wellbore cleanout operations.

Lower density particles like coke have been used in fracturing operations, for example, as described in U.S. Pat. No. 3,664,420. In said patent, the coke is used as a far-field diverter and not a proppant. Far-field diverters pack into the tip or end of the primary and secondary fractures to form a very low-permeability zone. In the patent, after the far-field diverters are pumped into the fracture tips, proppant particles of higher density and larger size (e.g., metallic shot) are packed into the majority of the fractures to form high-permeability zones.

SUMMARY OF THE INVENTION

The present disclosure generally relates to fracturing and, more specifically, to proppant particulates for fracturing that are formed from flexicoke, and methods related thereto.

A nonlimiting example fracturing fluid of the present disclosure comprises: a carrier fluid; and proppant particulates composed of flexicoke material.

A nonlimiting example method of the present disclosure comprises: introducing a fracturing fluid into a subterranean formation, the fracturing fluid comprising a carrier fluid and proppant particulates composed of flexicoke material.

The proppant particulates may have one or more of: a bulk density of less than about 1.0 g/cm$^3$; an apparent density in the range of about 1.0 g/cm$^3$ to about 2.0 g/cm$^3$; a carbon content of about 85 wt % to about 99 wt %; a weight ratio of carbon to hydrogen of about 80:1 to about 98:1; an impurities content of about 1 wt % to about 15 wt %; a sulfur content of about 0 wt % to about 5 wt %; a nitrogen content of about 0 wt % to about 3 wt %; a combined vanadium and nickel content of about 3000 ppm to about 45,000 ppm; a crush strength of about 3000 psi to about 12,000 psi; a Krumbein roundness value of $\geq 0.6$; a Krumbein sphericity of $\geq 0.6$; and an average particle size distribution in the range of about 150 µm to about 300 µm.

BRIEF DESCRIPTION OF DRAWINGS

The following drawings are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION OF THE INVENTION

The present disclosure generally relates to fracturing and, more specifically, to proppant particulates for fracturing that are formed from flexicoke, and methods related thereto.

As discussed above, proppant particulates can be used effectively during fracturing operations, but there may be issues associated with their use. First, the high densities of typical proppant particulates may hinder their transport, possibly leading to inadequate proppant particulate disposition within one or a plurality of fractures. Second, some proppant particulates are prone to fines formation due to low crush strength values, which may lead to decreased fracture conductivity due to fines accumulation within a wellbore.

The present disclosure alleviates the foregoing difficulties and provides related advantages as well. In particular, the present disclosure provides proppant particulates formed from flexicoke that may exhibit low densities and high crush strengths, thereby addressing two significant shortcomings of traditional proppant particulates, generally formed from sand particles.

Typically, flexicoke is used as a fuel source in various manufacturing processes for heat. However, flexicoke is a low BTU source. By using flexicoke as proppant and higher BTU fuel sources, the $CO_2$ emissions are reduced. In effect, using flexicoke as proppant is a form of sequestering carbon that would otherwise contribute to $CO_2$ emissions.

Moreover, the costs associated with hydraulic fracturing may also be reduced at least because large volumes of flexicoke are readily available from already existent petroleum refinery process streams and are typically cost-competitive to sand; and their low density may decrease or eliminate the need to use gelled fracturing fluids (and the costs associated with gelation), thereby potentially reducing required pumping pressures, water consumption, and wellbore cleanout operations.

Flexicoke is produced from a modified variation of fluid coking, termed FLEXICOKING™ (trademark of ExxonMobil Research and Engineering Company ("ExxonMobil")). FLEXICOKING™ is based on fluidized bed technology developed by ExxonMobil, and is a carbon rejection process that is used for upgrading heavy hydrocarbon feeds (referred to as "residua"). Unlike fluid coking, with utilizes a reactor and a burner, the FLEXICOKING™ process uses a reactor, a heater, and a gasifier. The FLEXICOKING™ process is described in greater detail below.

Illustrative aspects of the present disclosure include fracturing fluids comprising proppant particulates composed of flexicoke, derived from a FLEXICOKING™ process and comprising at least partially gasified fluid coke. The flexicoke proppant particulates are suitable for propping one or more fractures induced during a hydraulic fracturing operation within a horizontal, vertical, or tortuous wellbore, including hydrocarbon-bearing production wellbores and water-bearing production wellbores.

Definitions and Test Methods

As used herein, the term "proppant particulate" refers to a solid material capable of maintaining open an induced fracture during and following a hydraulic fracturing treatment. The term "proppant pack" refers to a collection of proppant particulates.

As used herein, the term "flexicoke" refers to the solid concentrated carbon material produced from FLEXICOKING™. The term "FLEXICOKING™" refers to a thermal cracking process utilizing fluidized solids and gasification for the conversion of heavy, low-grade hydrocarbon feeds into lighter hydrocarbon products (e.g., upgraded, more valuable hydrocarbons). The term "flexicoke proppant particulates" refers to proppant particulates composed of flexicoke (i.e., partially gasified fluid coke).

As used herein, the term "apparent density," with reference to density of proppant particulates, refers to the density of the individual particulates themselves, which may be expressed in grams per cubic centimeter ($g/cm^3$). The apparent density values of the present disclosure are based on the American Petroleum Institute's Recommended Practice 19C (hereinafter "API RP-19C") standard entitled "Measurement of Properties of Proppants Used in Hydraulic Fracturing and Gravel-packing Operations" (First Ed. May 2008, Reaffirmed June 2016).

As used herein, the term "bulk density," with reference to the density of proppant particulates, refers to the density of a proppant pack, which may be expressed in $g/cm^3$. The bulk density values of the present disclosure are based on API RP-19C.

As used herein, D10, D50, and D90 are primarily used herein to describe particle sizes. As used herein, the term "D10" refers to a diameter at which 10% of the sample (on a volume basis unless otherwise specified) is comprised of particles having a diameter less than said diameter value. As used herein, the term "D50" refers to a diameter at which 50% of the sample (on a volume basis unless otherwise specified) is comprised of particles having a diameter less than said diameter value. As used herein, the term "D90" refers to a diameter at which 90% of the sample (on a volume basis unless otherwise specified) is comprised of particles having a diameter less than said diameter value. Particle size can be determined by light scattering techniques or analysis of optical digital micrographs. Unless otherwise specified, light scattering techniques are used for analyzing particle size.

As used herein, the term "crush strength," with reference to proppant particulates, refers to the stress load proppant particulates can withstand prior to crushing (e.g., breaking or cracking). The crush strength values of the present disclosure are based on API RP-19C.

As used herein, the term "fracture conductivity" refers to the permeability of a proppant pack to conduct fluid at various stress (pressure) levels. The fracture conductivity values of the present disclosure are based on the American Petroleum Institute's Recommended Practice 19D (API RP-19D) standard entitled "Measuring the Long-Term Conductivity of Proppants" (First Ed. May 2008, Reaffirmed May 2015).

All numerical values within the detailed description and the claims herein are modified by "about" or "approximately" with respect to the indicated value, and take into account experimental error and variations that would be expected by a person having ordinary skill in the art.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

Proppants, Methods, and Systems

Hydraulic fracturing operations require effective proppant particulates to maintain the permeability and conductivity of a production well, such as for effective hydrocarbon recovery. Effective proppant particulates are typically associated with a variety of particular characteristics or properties, including efficient proppant particulate transport within a carrier fluid, sufficient crush strength to maintain fractures propped upon the removal of hydraulic pressure, and efficient conductivity once the wellbore is brought on production.

The rate of settling of a proppant particulate within a fracturing fluid at least in part determines its transport capacity within one or more fractures created during a hydraulic fracturing operation. The rate of settling of a proppant particulate may be determined using Equation 1:

$$v = \frac{\rho_p - \rho_f}{18\eta} g\sigma^2, \qquad \text{Equation 1}$$

where v is the proppant particle; $\rho_p - \rho_f$ is proportional to the density difference between the proppant particle and the carrier fluid; $\eta$ is the viscosity of the carrier fluid; g is the gravitational constant; and $\sigma^2$ is proportional to the square of the proppant particulate size. As will be appreciated, proppant particulates having lower apparent densities and/or smaller average particle sizes settle at a slower rate within an identical carrier fluid (thus having better transport) compared to higher apparent density and/or larger average particle sized proppant particulates.

A proppant particulate's crush strength is a measure of its ability to withstand stresses within a fracture, as they must resist sustained loads within a fractured subterranean formation during the lifetime of a wellbore to maintain its conductivity. Proppant particulates that are not able to withstand the imposed stresses of a fracture will crush over time, resulting in the formation of fines that may be transported into the wellbore with produced fluids and accumulate in sufficient quantities to decrease production rates and/or necessitate costly wellbore cleanout operations. Accordingly, proppant particulates with higher crush strengths are favorable. Such higher strength proppant particulates would additionally serve to promote fracture conductivity, particularly under increasing stresses. According to API RP-19C standards, adequate proppant particulates should have a crush strength in which less than 10% of fines are produced under a stress of 5,000 psi.

Proppant particulate efficacy is further related to fracture conductivity, characterized by the fluid flow rate in a propped fracture under gradient pressure, the fracture being propped by a proppant pack. Fracture conductivity, $C_f$, is the product of the proppant pack permeability, k, and its thickness, h, and may be determined using Equations 2 and 3:

$$C_f = kh, \qquad \text{Equation 2}$$

$$k = \frac{1}{C} \frac{\phi^3}{(1-\phi)^2} \sigma_{eff}^2 \Phi_s^2, \qquad \text{Equation 3}$$

where C is a constant; $\phi$ is the proppant pack void fraction; $\sigma$ is the average particle size diameter of the proppant particulates; and $\Phi$ is a shape factor related to the asphericity of the proppant particulates. In tension with settling rate and transport, fracture conductivity favors proppant particulates having larger average particle size diameters, as well as thick proppant packs and narrow particle size distribution.

The flexicoke proppant particulates having the characteristics described herein exhibit the aforementioned properties, as well as others, which make them not only a viable alternative for traditional sand proppant particulates, but further a surprising substitute with enhanced functionality. The FLEXICOKING™ process is very different from fluid or delayed coking processes and as such the mechanical properties of the carbon produced cannot be anticipated.

Briefly, the FLEXICOKING™ process in which the flexicoke for forming the flexicoke proppant particulates described herein, integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically about 496° C. to about 538° C. A return stream of coke sent from the gasifier to the heater provides the remainder of the heat requirement. The coke meeting the heat requirement is then circulated to the reactor and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor—the resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

Flexicoke produced from the FLEXICOKING™ process is quite different in composition than fluid cokes produced by the fluid coking process, as well as cokes produced using delayed coking. The gasification process of FLEXICOKING™ results in substantial concentration of metals in the flexicoke product and additionally allows for operational desulfurization of sulfur from the flexicoke. The gasification can be minimized or maximized to influence the sulfur content (minimization=lower sulfur content). Accordingly, unlike cokes formed in other processes, flexicoke has a comparatively high metal content and a comparatively lower sulfur content that can be manipulated. Notably, high metal content particles have not been considered adequate historically for use as proppant particulates, because such particles were considered to likely have low crush strengths incapable of withstanding formation pressures within fractures. However, as shown below, flexicoke exhibits the properties, including crush strength, for use as a proppant particulate.

The flexicoke proppant particulates described herein may have a carbon content of about 85 wt % to about 99 wt %, or about 90 wt % to about 96 wt %.

The flexicoke proppant particulates described herein may have a weight ratio of carbon to hydrogen of about 80:1 to about 98:1, or about 85:1 to about 95:1.

The flexicoke proppant particulates described herein may have an impurities content (weight percent of all components other than carbon and hydrogen) of about 1 wt % to about 15 wt %, or about 3 wt % to about 10 wt %.

Flexicoke has a higher metal content than other cokes. The flexicoke proppant particulates described herein may have a combined vanadium and nickel content of about 3000 ppm to about 45,000 ppm, or about 3000 ppm to about 15,000 ppm, or about 5000 ppm to about 30,000 ppm, or about 30,000 ppm to about 45,000 ppm.

The flexicoke proppant particulates described herein may have a sulfur content of 0 wt % to about 5 wt %, or about 0.5 wt % to about 4 wt %.

The flexicoke proppant particulates described herein may have a nitrogen content of 0 wt % to about 3 wt %, or about 0.1 wt % to about 2 wt %.

The apparent density of the flexicoke proppant particulates of the present disclosure may be in the range of about 1.0 grams per cubic centimeter (g/cm$^3$) to about 2.0 g/cm$^3$, or about 1.4 g/cm$^3$ to about 2.0 g/cm$^3$, or about 1.4 g/cm$^3$ to about 1.6 g/cm$^3$. Traditional sand proppant particulates generally have apparent densities greater than about 2.5 g/cm$^3$. Thus, the flexicoke proppant particulates described herein have substantially lesser apparent densities compared to traditional sand proppant particulates, which is indicative of their comparably more effective transport and lower settling rates within a fracture formed as part of a hydraulic fracturing operation.

The bulk density of the flexicoke proppant particulates of the present disclosure may be less than about 1.0 g/cm$^3$, including in the range of about 0.5 g/cm$^3$ to about 1.0 g/cm$^3$, or about 0.7 g/cm$^3$ to about 0.9 g/cm$^3$, or less than about 0.8 g/cm$^3$. As described above, bulk density may be indicative of the crush strength of a proppant material, favoring higher bulk densities to obtain greater crush strength. Surprisingly, the bulk densities of the flexicoke proppant particulates described herein are lower compared to traditional sand proppant particulates, which may be greater than about 1.3 g/cm$^3$, and yet the flexicoke proppant particulates maintain comparable or higher crush strengths at comparable particle sizes, as described below. Without being limited by theory, low density materials such as polymers generally have a compressive strength that is much less than sand, silica, and other ceramic materials, which have densities in a range of 2 g/cm$^3$ to 3 g/cm$^3$. Many low-density materials have good elastic properties in tension but are not as good in compression and often exhibit buckling and creep in compression testing. Further, low-density carbon particulate materials produced by high-temperature carbonizing materials such as coconut shells, bamboo, cotton, flax, and wood have very inferior mechanical properties. Engineered carbon fibers can break this paradigm, where many engineered carbon fibers have excellent properties in compression. Coke particles, at first glance, would generally be expected to have properties similar to low-density carbon particulate materials. However, it has been surprisingly observed that flexicoke particles have sufficiently high crush strength to be suitable for use as proppant.

Typical proppant particulates are comprised of sand having particle diameters ranging from about 100 micrometers (μm) to about 1000 μm. The flexicoke proppant particulates described herein are comparable in particle diameter size having a D50 of about 50 μm to about 500 μm, or about 100 μm to about 400 μm, or about 150 μm to about 350 μm.

As shown below, the deformation of the flexicoke proppant particulates of the present disclosure may be at least partially size dependent. In some aspects, the crush strength of the flexicoke proppant particulates described herein may be in the range of about 3000 psi to about 12,000 psi, or about 3000 psi to about 6000 psi, or about 5000 psi to about 10,000 psi, or about 7500 psi to about 12,000 psi.

The Krumbein Chart provides an analytical tool to standardize visual assessment of the sphericity and roundness of particles, including proppant particulates. Each of sphericity and roundness is visually assessed on a scale of 0 to 1, with higher values of sphericity corresponding to a more spherical particle and higher values of roundness corresponding to less angular contours on a particle's surface. According to API RP-19C standards, the shape of a proppant particulate is considered adequate for use in hydraulic fracturing operations if the Krumbein value for both sphericity and roundness is ≥0.6. As shown in the examples below, the shape of all but one sample of flexicoke proppant particulates tested herein exhibit a Krumbein value for both sphericity and roundness that is ≥0.6, and thus are suitable for use as proppant particulates.

The long-term conductivity of a proppant pack comprising the flexicoke proppant particulates of the present disclosure is comparable to traditional sand proppant particulates, particularly at comparable particle sizes, as shown herein below. Moreover, it is believed, without being bound by theory, that flexicoke proppant particulates may exhibit greater ductility compared to traditional sand proppant particulates, comparably decreasing their fines production under increasing stress.

The flexicoke proppant particulates described herein may be used as part of a fracturing fluid, comprising a flowable (e.g., liquid or gelled) carrier fluid and one or more optional additives. This fluid is usually formulated at the well site in a mixing process that is conducted while it is being pumped in the hydraulic fracturing process. When the fluid is formulated at the well site, flexicoke coke particles can be added in a manner similar to the known methods for adding sand into the fracturing fluid. In some aspects, it may be preferred that flexicoke material received from a FLEXI-COKING™ process are first processed (e.g., at the manufacturing facility) to remove any undesirably sized material that has adhered or otherwise conglomerated prior to use as proppant particulates. Optionally the removal process can be skipped, conducted at another facility, or be done in the field. In other or additional aspects, any fines may be preferably removed from the flexicoke proppant particulates, such as by use of bag filters, whether in storage or during transport. As such, a more uniform size distribution may be obtained. In addition to the flexicoke proppant particulates, it is within the scope of the present disclosure that the flexicoke proppant particulates be included alone or in combination with one or more other types of proppant particulates. When flexicoke proppant particulates are included in combination with another type of proppant particle, the various particles can be mixed as a dry solid, mixed in a slurry, or added separately into a fracturing fluid that is being formulated at the well site.

The carrier fluid of the present disclosure may be an aqueous-based fluid or a nonaqueous-based fluid. Aqueous-based fluids may include, for example, fresh water, saltwater (including seawater), treated water (e.g., treated production water), other forms of aqueous fluid, and any combination thereof. One aqueous based fluid class is often referred to as slickwater, and the corresponding fracturing operations are called slickwater fracturing. Nonaqueous-based fluids may include, for example, oil-based fluids (e.g., hydrocarbon, olefin, mineral oil), alcohol-based fluids (e.g., methanol), and any combination thereof.

In various aspects, the viscosity of the carrier fluid may be altered by foaming or gelling. Foaming may be achieved using, for example, air or other gases (e.g., $CO_2$, $N_2$), alone or in combination. Gelling may be achieved using, for example, guar gum (e.g., hydroxypropyl guar), cellulose, or other gelling agents, which may or may not be crosslinked using one or more crosslinkers, such as polyvalent metal ions or borate anions, among other suitable crosslinkers.

In some instances, the carrier fluid used in hydraulic fracturing of horizontal wells is one or more of an aqueous-based fluid type, particularly in light of the large volumes of fluid typically required for hydraulic fracturing (e.g., about 60,000 to about 1,000,000 gallons per wellbore). The aqueous-based fluid may or may not be gelled. Gelled, either crosslinked or uncrosslinked, fluids may facilitate better proppant particulate transport (reduced settling), as well as improved physical and chemical strength to withstand the temperature, pressure, and shear stresses encountered by the fracturing fluid during a hydraulic fracturing operation. In some instances, the fracturing fluid may comprise an aqueous-based carrier fluid, which may or may not be foamed or gelled, and an acid (e.g., HCl) to further stimulate and enlarge pore areas of the matrix of fracture surfaces. It is to be appreciated that the low density of the flexicoke proppant particulates described herein may allow a reduction or elimination of the need to foam or gel the carrier fluid.

In addition, certain fracturing fluids suitable for use in the present disclosure may contain one or more additives such as, for example, dilute aids, biocides, breakers, corrosion inhibitors, crosslinkers, friction reducers (e.g., polyacrylamides), gels, salts (e.g., KCl), oxygen scavengers, pH control additives, scale inhibitors, surfactants, weighting agents, inert solids, fluid loss control agents, emulsifiers, emulsion thinners, emulsion thickeners, viscosifying agents, particulates, lost circulation materials, foaming agents, gases, buffers, stabilizers, chelating agents, mutual solvents, oxidizers, reducers, clay stabilizing agents, and any combination thereof.

The present disclosure includes methods of hydraulic fracturing using a fracturing fluid comprising flexicoke proppant particulates, alone or in combination with other proppant particulates, during a hydraulic fracturing operation. That is, the flexicoke proppant particulates form the entirety of a proppant pack, or may form an integral part of a proppant pack. Other proppant particulate types that may be utilized with the flexicoke proppant particulates described herein include, but are not limited to, the traditional sand proppant particulates described herein, as well as those made from bauxite, ceramic, glass, and any combination thereof, and may or may not have surface modifications. Proppant particulates composed of other materials are also within the scope of the present disclosure, provided that any such selected proppant particulates (including those composed of the aforementioned materials) are able to maintain their integrity upon removal of hydraulic pressure within an induced fracture, such that about 80%, preferably about 90%, and more preferably about 95% or greater of the particle mass of the other proppant particulates retains integrity when subjected to 5000 psi of stress, a requirement also met by the flexicoke proppant particulates of the present disclosure. That is, both the flexicoke proppant particulates and any other proppant particulates used in the methods described herein must maintain mechanical integrity upon fracture closure, as both types of particulates must intermingle or otherwise associate to form functional proppant packs for a successful hydraulic fracturing operation.

The methods described herein include preparation of fracturing fluid, which is not considered to be particularly limited, because the flexicoke proppant particulates are capable of transportation in dry form or as part of a wet slurry from a manufacturing site (e.g., a refinery or synthetic fuel plant). Dry and wet forms may be transported via truck or rail, and wet forms may further be transported via pipelines. The transported dry or wet form of the flexicoke proppant particulates may be added to a carrier fluid, including optional additives, at a production site, either directly into a wellbore or by pre-mixing in a hopper or other mixing equipment. In some aspects, for example, when the entirety of the proppant particulates within the fracturing fluid at a given time are flexicoke proppant particulates, slugs of the dry or wet form may be added directly to the fracturing fluid (e.g., as it is introduced into the wellbore). These slugs of only flexicoke proppant particulates may be followed by subsequent slugs of, again, only flexicoke proppant particulates or of a mixture of flexicoke proppant particulates and other proppant particulates. In other aspects, such as when other proppant particulate types are combined with the flexicoke proppant particulates, a portion or all of the fracturing fluid may be pre-mixed at the production site or each proppant type may be added directly to the fracturing fluid separately. Any other suitable mixing or adding of the flexicoke proppant particulates to produce a desired fracturing fluid composition may also be used, without departing from the scope of the present disclosure.

The methods of hydraulic fracturing suitable for use in one or more aspects of the present disclosure involve pumping fracturing fluid comprising flexicoke proppant particulates at a high pump rate into a subterranean formation to form at least a primary fracture, as well as potentially one or more secondary fractures extending from the primary fracture, one or more tertiary fractures extending from the secondary fractures, and the like (all collectively referred to as a "fracture"). In a preferred embodiment, this process is conducted one stage at a time along a horizontal well. The stage is hydraulically isolated from any other stages which have been previously fractured. In one embodiment, the stage being fractured has clusters of perf holes (e.g., perforations in the wellbore and/or subterranean formation) allowing flow of hydraulic fracturing fluid through a metal tubular casing of the horizontal well into the formation. Such metal tubular casings are installed as part of the completions when the well is drilled and serve to provide mechanical integrity for the horizontal wellbore. In some aspects, the pump rate for use during hydraulic fracturing may be at least about 20 barrels per minute (bbl/min), preferably about 30 bbl/min, and more preferably in excess of 50 bbl/min and less than 1000 bbl/min at one or more time durations during the fracturing operation (e.g., the rate may be constant, steadily increased or pulsed). These high rates may, in some aspects, be utilized after about 10% of the entire volume of fracturing fluid to be pumped into the formation has been injected. That is, at the early periods of a hydraulic fracturing operation, the pump rate may be lower and as fracture(s) begin to form, the pump rate may be increased. Generally, the average pump rate of the fracturing fluid throughout the operation may be about 10 bbl/min, preferably about 15 bbl/min, and more preferably in excess of 25 bbl/minute and less than 250 bbl/min. Typically, the pump rate during a fracturing operation for more than 30% of the time required to complete fracturing of a stage is in the range of about 20 bbl/min to about 150 bbl/min, or about 40 bbl/min to about 120 bbl/min, or about 40 bbl/min to about 100 bbl/min.

In various aspects, the methods of hydraulic fracturing described herein may be performed wherein the concentration of the proppant particulates (including flexicoke proppant particulates and any other proppant particulates) within the injected fracturing fluid is altered (i.e., on-the-fly while the fracturing operation is being performed, such that hydraulic pressure is maintained within the formation and fracture(s)). For example, in some aspects, the initially injected fracturing fluid may be injected at a low pump rate and may comprise 0 volume % (vol %) to about 1 vol % proppant particulates. As one or more fractures begin to form and grow, the pump rate is increased and the concentration of proppant particulates may be increased in a stepwise fashion (with or without a stepwise increase in pump rate) with a maximum concentration of proppant particulates reaching about 2.5 vol % to about 20 vol %, encompassing any value and subset therebetween. For example, the maximum concentration of proppant particulates may reach at least 2.5 vol %, preferably about 8 vol %, and more preferably about 16 vol %. In some aspects, all of the proppant particulates are flexicoke proppant particulates. In other aspects, at one or more time periods during the hydraulic fracturing operation, at least about 2 vol % to about 100 vol % of any proppant particulates suspended within the fracturing fluid are flexicoke proppant particulates, such as at least about 2 vol %, preferably about 15 vol %, more preferably about 25 vol %, and even more preferably 100 vol %.

It should be noted that some or all of the flexicoke proppant particles may be coated. Coatings are often used on sand particles used in hydraulic fracturing to either improve their flowability or to mitigate their flow back during production. Such types of coatings are within the scope of this invention. It is possible to introduce coated flexicoke proppant particles at any stage of the hydraulic fracturing process with the resulting flexicoke composition being either a mixture of coated and uncoated flexicoke or entirely coated flexicoke.

In one or more aspects, the flexicoke proppant particulates may be introduced after about ⅛ to about ¾ of the total volume of fracturing fluid has been injected within a formation. Because of the low density of the flexicoke proppant particulates, it may be beneficial to introduce the flexicoke proppant particulates during later time periods of fracturing after which the fracture(s) have already grown substantially, such that the flexicoke proppant particulates can travel within the fracturing fluid to remote locations of the formed fracture(s). Denser proppant particulates would not be able to reach these remote locations due to settling effects, for example.

The hydraulic fracturing methods described herein may be performed in drilled horizontal, vertical, or tortuous wellbores, hydrocarbon-producing (e.g., oil and/or gas) wellbores and water-producing wellbores. These wellbores may be in various subterranean formation types including, but not limited to, shale formations, oil sands, gas sands, and the like.

The wellbores are typically completed using a metal (e.g., steel) tubular or casing that is cemented into the subterranean formation. To contact the formation, a plurality of perforations are created through the tubular and cement along a section to be treated, usually referred to as a plug and perforated ("plug and perf") cased-hole completion. Alternative completion techniques may be used without departing from the scope of the present disclosure, but in each technique, a finite length of the wellbore is exposed for hydraulic fracturing and injection of fracturing fluid. This finite section is referred to herein as a "stage." In plug and perf completions, the stage length may be based a distance over which the tubular and cement has been perforated, and may be in the range of about 10 feet (ft) to about 2000 ft, for example, and more generally in the range of about 100 ft to about 300 ft. The stage is isolated (e.g., sliding sleeve, ball) such that pressurized fracturing fluid from the surface can flow through the perforations and into the formation to generate one or more fractures in only the stage area. Clusters of perforations may be used to facilitate initiation of multiple fractures. For example, clusters of perforations may be made in sections of the stage that are about 1 ft to about 3 ft in length, and spaced apart by about 2 ft to about 30 ft.

For each linear foot of the stage, at least about 6 barrels (about 24 cubic feet ($ft^3$)), preferably about 24 barrels (about 135 $ft^3$), and more preferably at least 60 barrels (about 335 $ft^3$) and less than 6000 barrels (about 33,500 $ft^3$) of fracturing fluid may be injected to grow the one or more fractures. In certain aspects, for each linear foot of the stage, at least about 1.6 $ft^3$, preferably about 6.4 $ft^3$, and more preferably at least 16 $ft^3$ and less than 1600 $ft^3$ of proppant particulates may be injected to prop the fractures. In some aspects, to prevent bridging of the proppant particulates during injection into the fractures, the ratio of the volume of the proppant particulates to the liquid portion of the fracturing fluid, primarily the carrier fluid, is greater than 0 and less than about 0.25 and preferably less than about 0.15. If the volume ratio becomes too large a phenomena known as "sanding out" will occur.

Certain commercial operations, such as commercial shale fracturing operations, may be particularly suitable for hydraulic fracturing using the flexicoke proppant particulates and methods described herein, as the mass of proppant particulates required per stage in such operations can be quite large and substantial economic benefit may be derived using the flexicoke proppant particulates. The cost of flexicoke particles can be less than the cost of sand, which provides a significant economic benefit. Indeed, in some instances, a stage in a shale formation may be designed to require at least about 30,000, preferably about 100,000, and more preferably about 250,000 pounds (mass) of proppant particulates. In such cases, economic and performance benefit may be optimized when at least about 5%, preferably more than about 25%, and up to 100% of the proppant particulate mass comprises flexicoke proppant particulates.

Multiple stages of the wellbore are isolated and hydraulic fracturing performed at each stage. The flexicoke proppant particulates of the present disclosure may be used in any one, more, or all more stages, including at least 2 stages, preferably at least 10 stages, and more preferably at least 20 stages.

Example Embodiments

A first nonlimiting example embodiment of the present disclosure is a fracturing fluid comprising: a carrier fluid; and proppant particulates composed of flexicoke material. The first nonlimiting example embodiment may include one or more of: Element 1: wherein the proppant particulates have a bulk density of less than about 1.0 g/cm$^3$; Element 2: wherein the proppant particulates have an apparent density in the range of about 1.0 g/cm$^3$ to about 2.0 g/cm$^3$; Element 3: wherein the flexicoke proppant particulates have one or more of: (a) a carbon content of about 85 wt % to about 99 wt %, (b) a weight ratio of carbon to hydrogen of about 80:1 to about 98:1, (c) an impurities content of about 1 wt % to about 15 wt %, (d) a sulfur content of about 0 wt % to about 5 wt %, (e) a nitrogen content of about 0 wt % to about 3 wt %; and (f) a combined vanadium and nickel content of about 3000 ppm to about 45,000 ppm; Element 4: wherein the proppant particulates have a crush strength of about 3000 psi to about 12,000 psi; Element 5: wherein the proppant particulates have a Krumbein roundness value of ≥0.6; Element 6: wherein the proppant particulates have a Krumbein sphericity of ≥0.6; Element 7: wherein the proppant particulates have an average particle size distribution in the range of about 150 μm to about 300 μm; Element 8: wherein the carrier fluid is an aqueous carrier fluid; and Element 9: the fracturing fluid further comprising second proppant particulates composed of a material that is not a flexicoke material. Examples of combinations include, but are not limited to, Element 1 in combination with one or more of Elements 2-9, Element 2 in combination with one or more of Elements 3-9, Element 3 in combination with one or more of Elements 4-9, Element 4 in combination with one or more of Elements 5-9, Element 5 in combination with one or more of Elements 6-9, Element 6 in combination with one or more of Elements 7-9, Element 7 in combination with one or both of Elements 8-9, and Element 8 in combination with Element 9.

A second nonlimiting example embodiment of the present disclosure is a method comprising: introducing a fracturing fluid into a subterranean formation, the fracturing fluid comprising a carrier fluid and proppant particulates composed of flexicoke material. The second nonlimiting example embodiment may include one or more of: Element 1; Element 2; Element 3; Element 4; Element 5; Element 6; Element 7; Element 8; Element 9; Element 10: the method further comprising depositing at least a portion of the proppant particulates within one or more fractures in the subterranean formation; Element 11: the method further comprising: sequestering carbon in the subterranean formation in the form of the flexicoke material. Examples of combinations include, but are not limited to, Element 1 in combination with one or more of Elements 2-11, Element 2 in combination with one or more of Elements 3-11, Element 3 in combination with one or more of Elements 4-11, Element 4 in combination with one or more of Elements 5-11, Element 5 in combination with one or more of Elements 6-11, Element 6 in combination with one or more of Elements 7-11, Element 7 in combination with one or more of Elements 8-11, Element 8 in combination with one or more of Elements 9-11, Element 9 in combination with one or both of Elements 10-11, and Element 10 in combination with Element 11.

To facilitate a better understanding of the aspects of the present disclosure, the following examples of preferred or representative aspects are given. In no way should the following examples be read to limit, or to define, the scope of the disclosure.

EXAMPLES

In the following examples, properties of flexicoke proppant particulates are compared to properties of traditional sand proppant particulates. The flexicoke proppant particulates were obtained from the ExxonMobil Refinery located in Baytown, Tex. The sand proppant particulates comprised traditional 100 mesh Texas brown sands mined for use as proppant particulates in the Permian basin.

Figure 1:
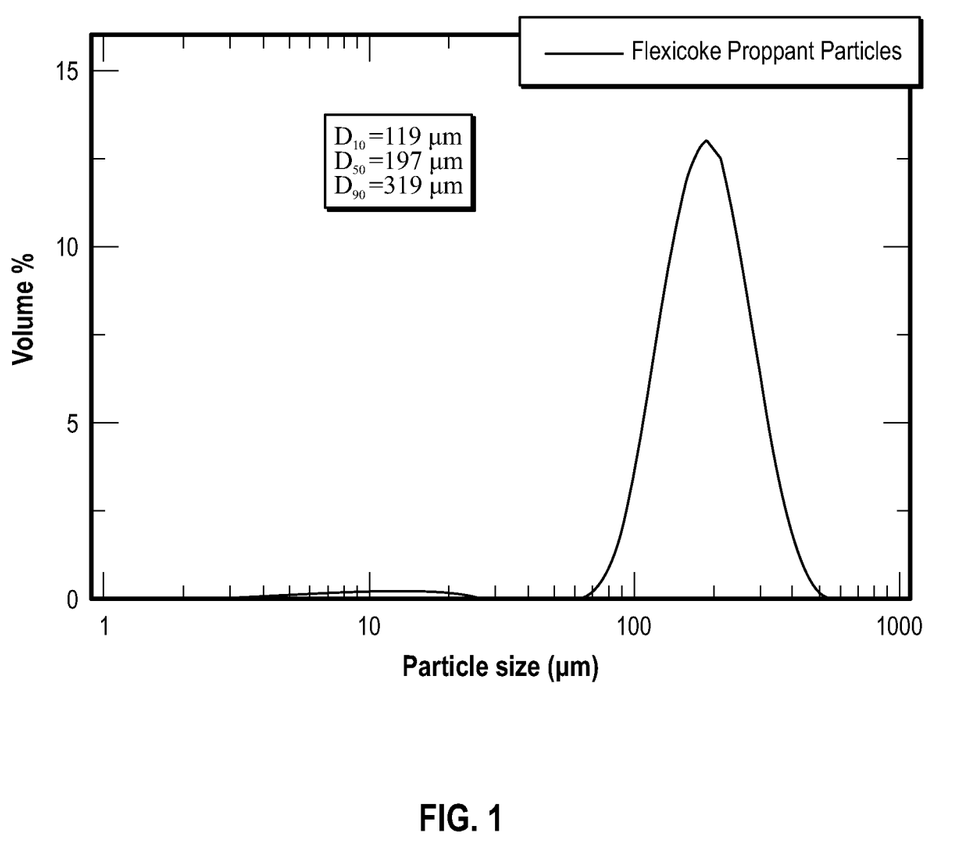
FIG. 1 shows a particle size distribution chart of samples of flexicoke proppant particulates for use in one or more aspects of the present disclosure.

At the outset, the flexicoke proppant particulates for use in the examples were characterized by size. The particle size distribution is shown in FIG. 1. As shown, about 82% of the flexicoke proppant particles by weight were within a particle size range of about 74 μm to about 425 μm. The average particle size (D50) of the flexicoke proppant particulates was 197 μm; the D10 value was 119 μm; and the D90 value was 319 μm. These sizes are comparable to the 100 mesh sand proppant particles, which have an average particle size of 149 μm.

Example 1: Physical Property Characterization

Two (2) samples of flexicoke proppant particulates were sieved to obtain a size range between 147 μm and 250 μm and characterized using mercury (Hg) porosimetry and nitrogen ($N_2$) adsorption.

Figure 2:
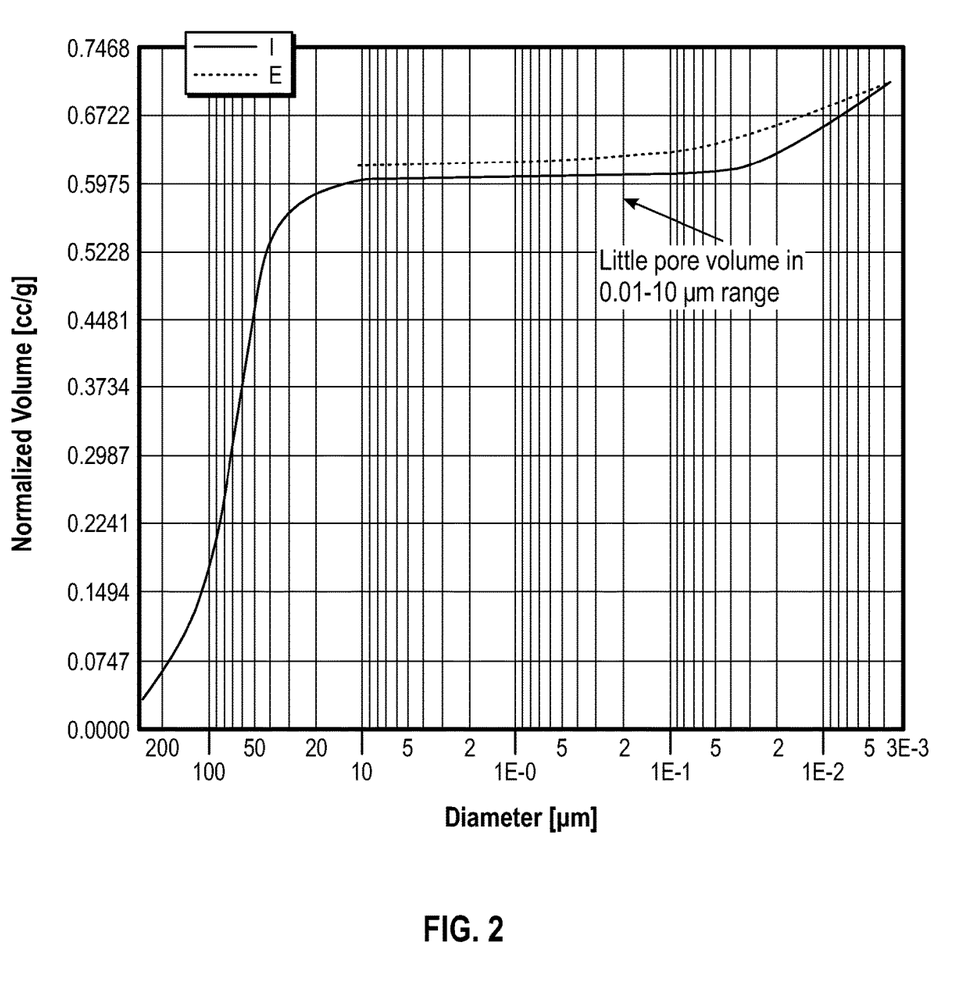
FIG. 2 shows a mercury porosimetry chart of a sample of flexicoke proppant particulates for use in one or more aspects of the present disclosure.

Hg Porosimetry. Standard mercury porosimetry was used to measure the internal porosity of the sampled flexicoke proppant particulates. The results are shown in FIG. 2. As shown, the flexicoke proppant particulates comprise minimum internal porosity in the 0.01 to 10.0 μm range.

Figure 3:
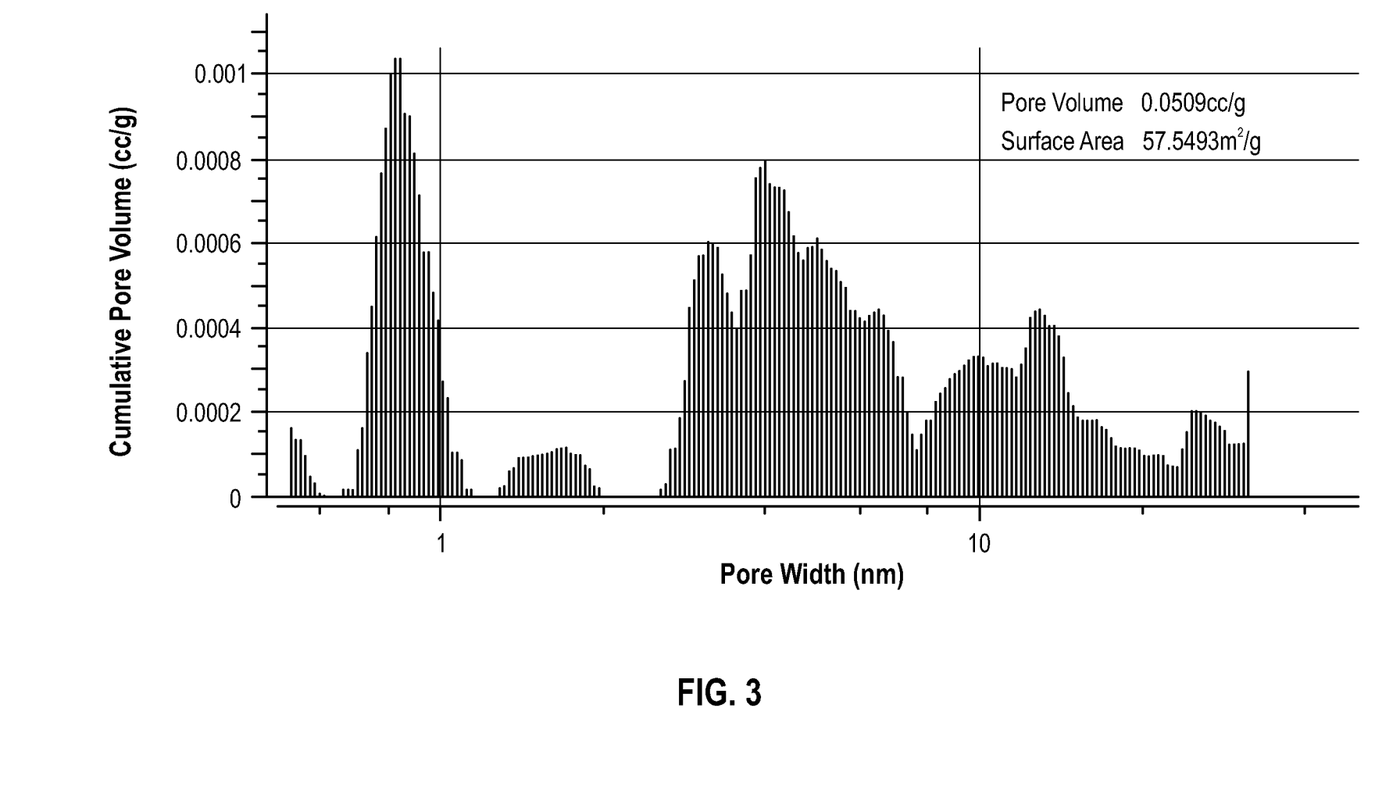
FIG. 3 shows a nitrogen adsorption chart of a sample of flexicoke proppant particulates for use in one or more aspects of the present disclosure.

$N_2$ Adsorption. The nanopore volume and surface area of the flexicoke proppant particulates was measured using standard nitrogen adsorption. The results are shown in FIG. 3. As shown, the nanopore volume of the flexicoke proppant particulates is about 0.05 $cm^3/g$ and the surface area is about 60 $m^2/g$.

Example 2: API Characterization

Three (3) experimental samples of the flexicoke proppant particulates were sieved according to Table 1 below and compared to one (1) control sample of the sand proppant particulates having an average particle size of 100 mesh (149 μm). The experimental flexicoke proppant particulate samples are labeled EX1, EX2, and EX3 herein, and the control sand proppant particulates sample is labeled CL herein.

TABLE 1

| Sample | Sieve Size Range |
| --- | --- |
| EX1 | (−) 425 μm/(+) 230 μm |
| EX2 | (−) 230 μm/(+) 140 μm |
| EX3 | (−) 140 μm/(+) 74 μm |

Accordingly, the flexicoke proppant particulates in sample EX1 are larger than the flexicoke proppant particulates in sample EX2, and the flexicoke proppant particulates in sample EX1 and EX2 are larger than the flexicoke proppant particulates in sample EX3.

Density. The EX1, EX2, EX3, and CL samples of Table 1 were tested using API PR-19C for bulk density ($\rho_{bulk}$) and apparent density ($\rho_{apparent}$). The results are shown in Table 2 below.

TABLE 2

| Sample | $\rho_{bulk}$ (g/cm$^3$) | $\rho_{apparent}$ (g/cm$^3$) |
| --- | --- | --- |
| EX1 | 0.74 | 1.46 |
| EX2 | 0.77 | 1.47 |
| EX3 | 0.79 | 1.53 |
| CL | 1.47 | 2.66 |

As shown in Table 2, the values for the bulk and apparent densities of the EX1, EX2, and EX3 flexicoke samples show vary little variation with respect to sieved particle size. However, the EX1, EX3, and EX3 samples exhibit substantially lower bulk and apparent densities compared to the CL sample—approximately half.

Crush Strength. The EX1, EX2, EX3, and CL samples of Table 1 were tested using API PR-19C for crush strength. Each of the samples was initially sieved using the sieve ranges shown in Table 3. The collected median diameter size ($d_{med}$) and average diameter size (<d>) are also shown in Table 3. The sieved samples were subject to increasing stress loads and the stress level, in pounds per square inch (psi), at which 10% of each sample was crushed to a size below the smallest initial sieve range is shown in Table 3.

TABLE 3

| Sample | Sieve Size | $d_{med}$ (μm) | <d> (μm) | Crush (psi) |
|---|---|---|---|---|
| EX1 | 40/70 | 288 | 292 | 6000 |
| EX2 | 70/140 | 178 | 182 | 9000 |
| EX3 | 70/140 | 106 | 108 | 2000 |
| CL | 50/140 | 178 | 185 | 10000 |

As shown in Table 3, the EX2 sample exhibits a comparable crush strength compared to the CL sample, each having near identical proppant particulate particle size. The EX1 sample exhibited a lower crush strength, but would still meet the API RP-19C standard for use as proppant particulates, as described above. The EX3 sample exhibited a much reduced crush strength compared to the other samples. Without being bound by theory, it is believed that this result is due to the much reduced particle size collected during the sieving process in preparation for crush testing, such that the smaller sized particles fit through the mesh with even minimally applied stress. This suggests that crush strength for the flexicoke particles may be at least potentially dependent on particle size, where a range of size is preferred in terms of crush strength compared to smaller or larger particles sizes outside of side range.

Shape. The shape of the EX1, EX2, EX3, and CL samples of Table 1 were examined using the Krumbein Scale. As provided above, the shape of a proppant particulate is considered sufficient if the Krumbein value for both sphericity and roundness is ≥0.6. The visual analysis for the EX1, EX2, EX3, and CL samples are shown in Table 4.

TABLE 4

| Sample | Sphericity | Roundness |
|---|---|---|
| EX1 | 0.6 | 0.5 |
| EX2 | 0.6 | 0.6 |
| EX3 | 0.6 | 0.7 |
| CL | 0.6 | 0.7 |

Table 4 demonstrates that the EX2 and EX3 sphericity and roundness values are compliant with the criterion Krumbein value of ≥0.6 and are, accordingly, sufficient for proppant particulate usage in terms of shape. The sphericity of EX1 is 0.6. However, EX3 exhibited marginal roundness at 0.5.

Figure 4A:
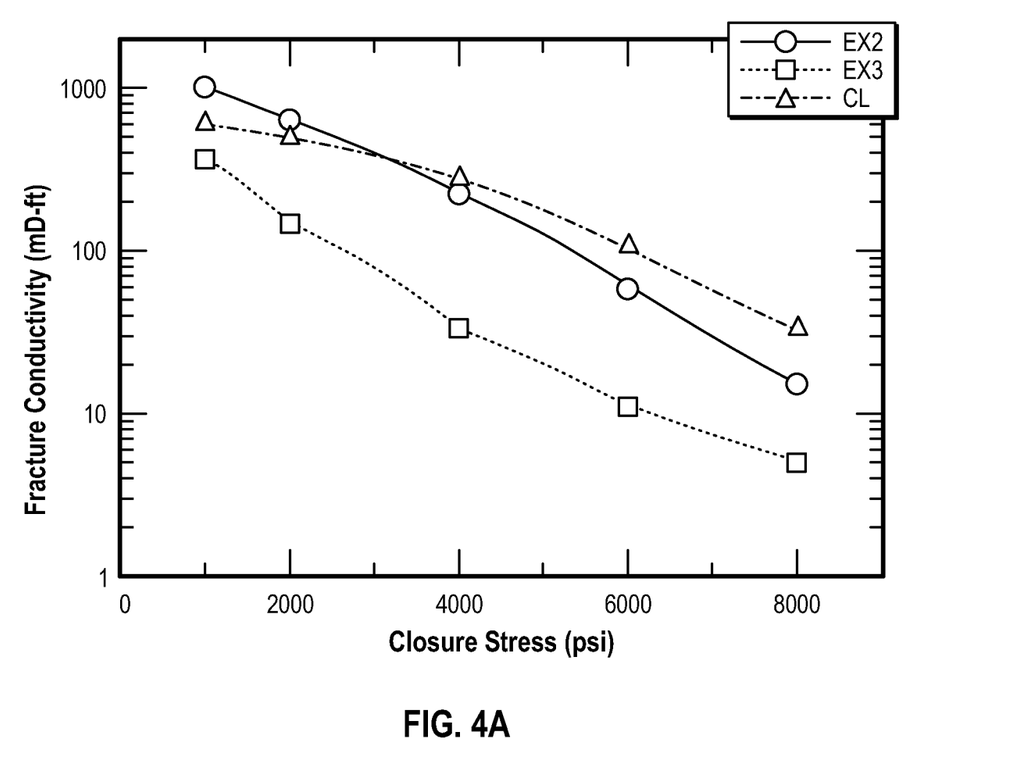
FIG. 4A shows a chart of the results of long-term conductivity testing of samples of flexicoke proppant particulates for use in one or more aspects of the present disclosure.

Long-term Conductivity. The EX2, EX3, and CL samples of Table 1 were tested using API PR-19D for long-term conductivity. The results are shown in FIG. 4A and demonstrate that EX2 and CL exhibit comparable long-term conductivity. As shown above, EX3 having relatively smaller particles exhibited comparatively reduced long-term conductivity, indicating that smaller particles of flexicoke may be less preferable to comparably larger particles of flexicoke as proppant particulates.

Figure 4B:
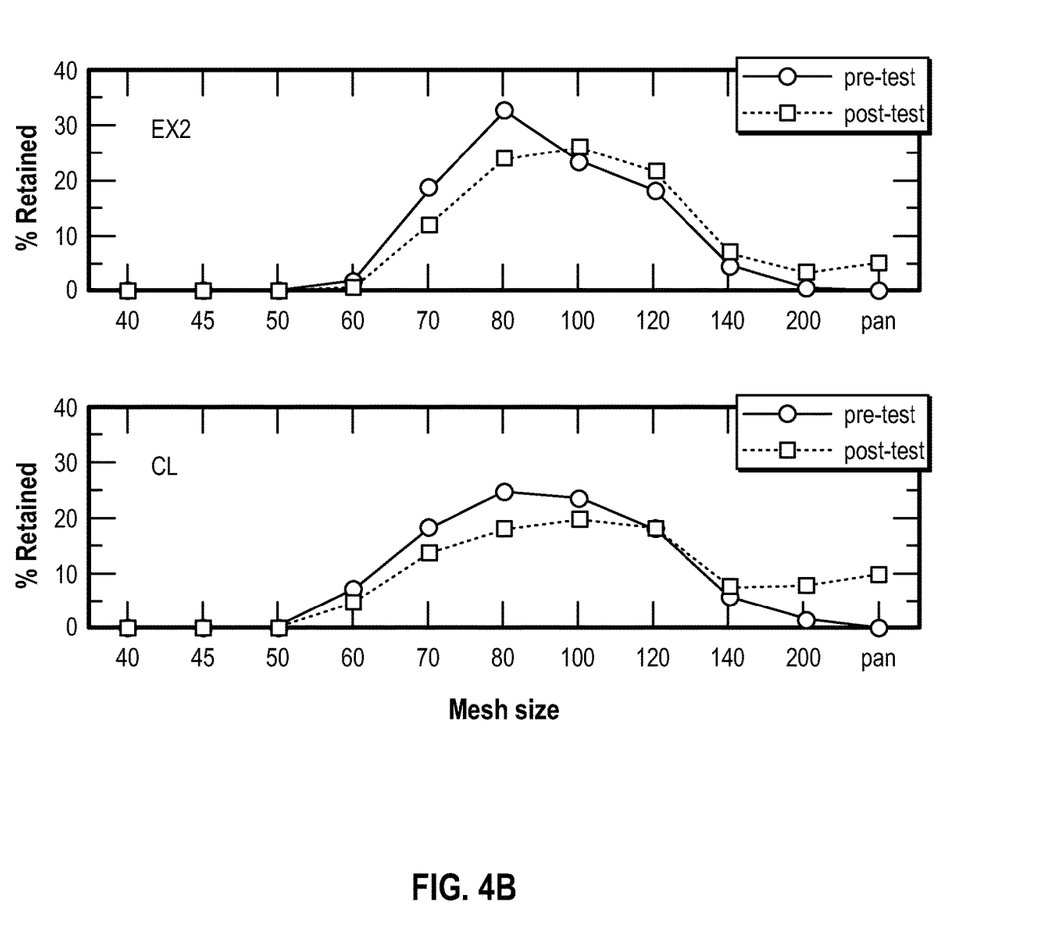
FIG. 4B shows a sieve size chart of the size of the tested flexicoke proppant particulate samples of FIG. 4A both before and after conducting the long-term conductivity testing.

Prior to, and after, the long-term conductivity testing, the particle size distribution of the EX2 and CL samples were evaluated for comparison. The results are shown in FIG. 4B. Both of the EX2 and CL samples experienced a shift in particle sieve size distribution toward smaller mesh sizes after testing (applying closure pressure), but a larger fraction of the CL sample were finer in size (labeled "pan") compared to the EX2 sample at the end of testing. Without being bound by theory, it is believed that this result is associated with an increased ductility of the flexicoke material compared to traditional sand. That is, proppant pack permeability loss may be more influenced by deformation and consolidation of proppant particulates and because sand is more brittle compared to flexicoke, it will maintain its shape and permeability at certain stress levels, but begins to fail as stress levels increase.

Accordingly, the flexicoke proppant particulates of the present disclosure are suitable for use in hydraulic fracturing operations, including in unconventional formation types.

As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A fracturing fluid comprising:
a carrier fluid; and
proppant particulates having an average particle size distribution of about 150 μm to about 300 μm and composed of flexicoke material that is at least partially gasified coke.

2. The fracturing fluid of claim 1, wherein the proppant particulates have a bulk density of less than about 1.0 g/cm$^3$.

3. The fracturing fluid of claim 1, wherein the proppant particulates have an apparent density in the range of about 1.0 g/cm$^3$ to about 2.0 g/cm$^3$.

4. The fracturing fluid of claim 1, wherein the flexicoke proppant particulates have one or more of: (a) a carbon content of about 85 wt % to about 99 wt %, (b) a weight ratio of carbon to hydrogen of about 80:1 to about 98:1, (c) an impurities content of about 1 wt % to about 15 wt %, (d) a sulfur content of about 0 wt % to about 5 wt %, (e) a nitrogen content of about 0 wt % to about 3 wt %; or (f) a combined vanadium and nickel content of about 3000 ppm to about 45,000 ppm.

5. The fracturing fluid of claim 1, wherein the proppant particulates have a crush strength of about 3000 psi to about 12,000 psi.

6. The fracturing fluid of claim 1, wherein the proppant particulates have a Krumbein roundness value of ≥0.6.

7. The fracturing fluid of claim 1, wherein the proppant particulates have a Krumbein sphericity of ≥0.6.

8. The fracturing fluid of claim 1, wherein the carrier fluid is an aqueous carrier fluid.

9. A fracturing fluid comprising:
a carrier fluid;
first proppant particulates composed of flexicoke material that is at least partially gasified coke; and
second proppant particulates composed of a material that is not a flexicoke material.

10. A method comprising:
introducing a fracturing fluid into a subterranean formation, the fracturing fluid comprising a carrier fluid and proppant particulates having an average particle size distribution of about 150 μm to about 300 μm and composed of flexicoke material that is at least partially gasified coke.

11. The method of claim 10, further comprising:
depositing at least a portion of the proppant particulates within one or more fractures in the subterranean formation.

12. The method of claim 10, wherein the proppant particulates have a bulk density of less than about 1.0 g/cm$^3$.

13. The method of claim 10, wherein the proppant particulates have an apparent density in the range of about 1.0 g/cm$^3$ to about 2.0 g/cm$^3$.

14. The method of claim 10, wherein the flexicoke proppant particulates have one or more of: (a) a carbon content of about 85 wt % to about 99 wt %, (b) a weight ratio of carbon to hydrogen of about 80:1 to about 98:1, (c) an impurities content of about 1 wt % to about 15 wt %, (d) a sulfur content of about 0 wt % to about 5 wt %, (e) a nitrogen content of about 0 wt % to about 3 wt %; or (f) a combined vanadium and nickel content of about 3000 ppm to about 45,000 ppm.

15. The method of claim 10, wherein the proppant particulates have a crush strength of about 3000 psi to about 12,000 psi.

16. The method of claim 10, wherein the proppant particulates have a Krumbein roundness value of ≥0.6.

17. The method of claim 10, wherein the proppant particulates have a Krumbein sphericity of ≥0.6.

18. The method of claim 10, wherein the carrier fluid is an aqueous carrier fluid.

19. The method of claim 10, wherein the fracturing fluid further comprises second proppant particulates composed of a material that is not a flexicoke material.

20. The method of claim 10, further comprising: sequestering carbon in the subterranean formation in the form of the flexicoke material.

* * * * *